US008484975B2

(12) United States Patent
West et al.

(10) Patent No.: US 8,484,975 B2
(45) Date of Patent: Jul. 16, 2013

(54) APPARATUS AND METHOD FOR START-UP OF A POWER PLANT

(75) Inventors: James West, Simpsonville, SC (US); Sam Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1254 days.

(21) Appl. No.: 12/026,203

(22) Filed: Feb. 5, 2008

(65) Prior Publication Data

US 2009/0193787 A1    Aug. 6, 2009

(51) Int. Cl.
*F01K 13/02* (2006.01)
*F02C 7/22* (2006.01)

(52) U.S. Cl.
USPC .................................. 60/656; 60/646; 60/778

(58) Field of Classification Search
USPC .............. 60/656, 646, 39.182, 795, 782, 785, 60/39.5, 786, 778
See application file for complete search history.

(56) References Cited

U.S. PATENT DOCUMENTS

| | | | |
|---|---|---|---|
| 5,388,960 A * | 2/1995 | Suzuki et al. | 415/176 |
| 5,473,898 A | 12/1995 | Briesch | |
| 5,498,131 A | 3/1996 | Minto | |
| 6,162,018 A | 12/2000 | Beeck | |
| 7,124,591 B2 * | 10/2006 | Baer et al. | 60/786 |
| 7,267,525 B2 | 9/2007 | Hiegemann | |
| 2005/0150229 A1 * | 7/2005 | Baer et al. | 60/772 |
| 2005/0235649 A1 * | 10/2005 | Baer et al. | 60/772 |
| 2005/0268594 A1 | 12/2005 | Kurihara et al. | |
| 2006/0254280 A1 * | 11/2006 | Briesch et al. | 60/772 |

FOREIGN PATENT DOCUMENTS

| | | |
|---|---|---|
| JP | 56-049207 U | 5/1981 |
| JP | 58-096102 A | 5/1983 |
| JP | 7-063010 A | 3/1995 |
| JP | 10-331610 A | 12/1998 |
| JP | 11-247604 A | 9/1999 |
| JP | 2000-130940 A | 5/2000 |
| JP | 2005-232966 A | 9/2005 |

\* cited by examiner

*Primary Examiner* — Gerald Sung
(74) *Attorney, Agent, or Firm* — Sutherland Asbill & Brennan LLP

(57) ABSTRACT

A power plant is provided which includes a gas turbine having a compressor for producing compressed air and a combustor for combusting the compressed air with a combustible fuel to produce a heated combustion gas. The power plant also includes a heat recovery steam generator for generating a flow of steam from an exhaust of the gas turbine and a steam turbine for expanding the flow of steam from the heat recovery steam generator. The steam turbine has a rotor having a rotor bore disposed axially therein. The power plant also includes a conduit for directing at least a portion of the compressed air or at least a portion of the heated combustion gas from the gas turbine to the rotor bore of the steam turbine, wherein the compressed air or the heated combustion gas may warm the rotor bore of the steam turbine.

10 Claims, 2 Drawing Sheets

APPARATUS AND METHOD FOR START-UP OF A POWER PLANT

TECHNICAL FIELD

The present application relates to a start-up process for a combined cycle power plant.

BACKGROUND OF THE INVENTION

Combined cycle power plants generally include a gas turbine, which utilizes the Brayton cycle, and a steam turbine, which utilizes the Rankine cycle. Greater efficiency may be achieved by utilizing a gas turbine and a steam turbine in combination than may be achieved by utilizing a gas turbine or a steam turbine independently. A combined cycle power plant typically includes a gas turbine, a heat recovery steam generator, and a steam turbine. A gas turbine is coupled with a generator to generate electricity. An exhaust gas from the gas turbine is introduced into the heat recovery steam generator to generate a flow of steam. The steam drives the steam turbine, which is coupled with a generator to generate additional electricity.

Minimizing start-up times improves the availability of combined cycle power plants and reduces maintenance cost and start-up emissions. The overall start-up time for a combined cycle power plant is limited by the start-up time of the steam turbine. Gas turbine start-up is fast relative to steam turbine start-up. During start up there is a relatively rapid increase in the exhaust temperature from the gas turbine. As the load of the gas turbine increases, a limit is reached on the exhaust temperature. A gas turbine controller then increases the airflow of the unit while maintaining the exhaust temperature limit. The exhaust flow and exhaust temperature is directly related to the amount of energy discharged in the heat recovery steam generator and the steam temperature generated by the heat recovery steam generator.

Steam turbine start-up is slow relative to gas turbine start-up. The start-up time of the steam turbine is limited by thermal stresses caused by temperature gradients between the rotor core and blades. These thermal stresses are monitored by measuring the temperature difference between the rotor and the steam at the inlet of the steam turbine. The allowable steam inlet temperature is limited by the rotor temperature. As the rotor temperature increases, higher inlet steam temperatures are allowed. Because the steam turbine rotor temperature sets a limit on the allowable inlet steam temperature and the gas turbine exhaust temperature controls the steam temperature, the gas turbine may not increase in load until the steam turbine rotor is heated to a sufficient temperature. This may reduce revenue by causing the power plant to operate for an extended period at a lower efficiency condition. Start-up emissions also may be increased because the load of the gas turbine may be too low for the combustor to operate in an efficient manner, thus causing concentrations of emissions such as NOx and CO to be greater than they would at higher load conditions.

A method and apparatus for warming a steam turbine during start-up of the gas turbine is desirable in order to reduce thermal stresses and decrease start-up times of a combined cycle power plant.

BRIEF DESCRIPTION OF THE INVENTION

In one embodiment, the present application provides a power plant. The power plant may include a gas turbine having a compressor for producing compressed air and a combustor for combusting the compressed air with a combustible fuel to produce a heated combustion gas. The power plant also may include a heat recovery steam generator for generating a flow of steam from an exhaust of the gas turbine and a steam turbine for expanding the flow of steam from the heat recovery steam generator. The steam turbine may have a rotor having a rotor bore disposed axially therein. The power plant also may include a conduit for directing at least a portion of the compressed air or at least a portion of the heated combustion gas from the gas turbine to the rotor bore of the steam turbine, wherein the compressed air or the heated combustion gas may warm the rotor bore of the steam turbine.

Another embodiment of the present application provides for a method of heating a steam turbine during start-up of a power plant having (i) a gas turbine having a compressor, a combustor, and a turbine for expanding a heated combustion gas, (ii) a heat recovery steam generator, and (iii) a steam turbine having a rotor having a rotor bore disposed axially therein. The method of heating the steam turbine during start-up includes compressing ambient air in the compressor to produce compressed air, removing at least a portion of the compressed air from the compressor, and providing the compressed air to the rotor bore of the steam turbine, wherein the compressed air heats the rotor.

A further embodiment of the present application provides for a method of heating a steam turbine during start-up of a power plant having (i) a gas turbine having a compressor, a combustor, and a turbine for expanding a heated combustion gas, (ii) a heat recovery steam generator, and (iii) a steam turbine having a rotor having a rotor bore disposed axially therein. The method of heating the steam turbine during start-up includes compressing ambient air in the compressor to produce compressed air, combusting the compressed air with a combustible fuel to produce a heated combustion gas, removing at least a portion of the heated combustion gas from the combustor, and providing the heated combustion gas to the rotor bore of the steam turbine, wherein the heated combustion gas heats the rotor.

DETAILED DESCRIPTION OF THE INVENTION

Figure 1:
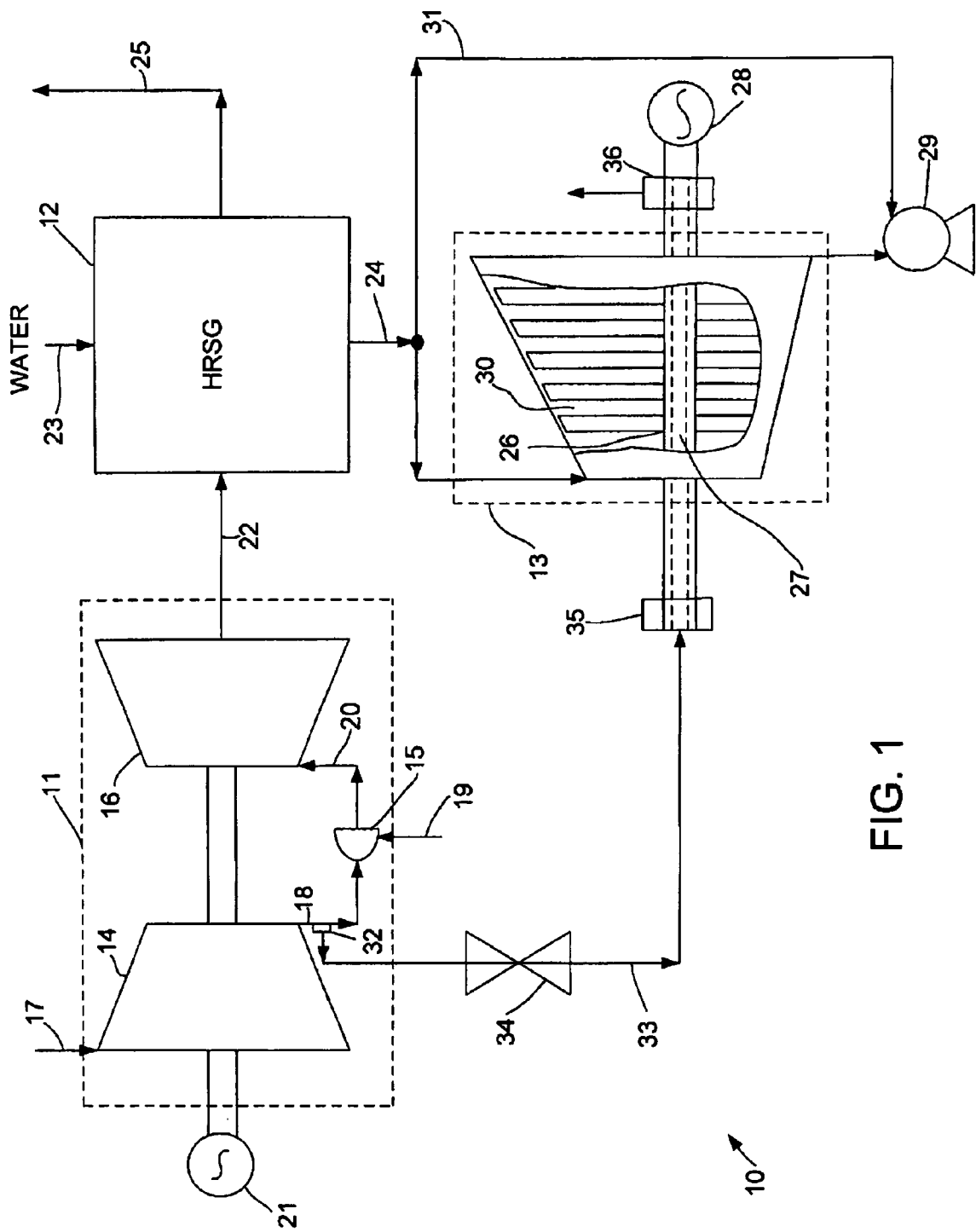
FIG. 1 is a schematic view of a power plant of an embodiment of the present application as described herein.

Referring now to the drawings, in which like numerals indicate like elements throughout the separate views, FIG. 1 shows a schematic view of a power plant 10 of a particular embodiment of the present application. The power plant 10 may include a gas turbine 11, a heat recovery steam generator ("HRSG") 12, and a steam turbine 13.

The gas turbine 11 may include a compressor 14, a combustor 15, and a turbine 16. In normal operation, ambient air 17 may be compressed by the compressor 14 to produce compressed air 18. The compressed air 18 may be provided to the combustor 15 along with a combustible fuel 19. In the combustor 15 the combustible fuel 19 may be combusted with the compressed air 18 to produce a heated combustion gas 20. In particular embodiments the combustible fuel may include natural gas, hydrogen, propane, butane, isopropane, gasoline, diesel fuel, jet fuel, kerosene, ethanol, isopropyl alcohol, or synthetic gases derived from coal. The heated combustion gas 20 then may be provided to the turbine 16, wherein the heated combustion gas 20 may be expanded, thereby generating rotary work. The turbine 16 may be coupled with a first generator 21 to generate electricity.

The exhaust 22 from the turbine 16 of the gas turbine 11 may be directed to the heat recovery steam generator 12. In the heat recovery steam generator 12, heat may be transferred from the gas turbine exhaust 22 to a feedwater flow 23 thereby generating a flow of steam 24. After flowing through the heat recovery steam generator 12, the cooled exhaust gas then may be discharged to the atmosphere via a stack 25. In a particular embodiment the heat recovery steam generator 12 may include ductwork including finned tubes for the feedwater flow 23. The hot exhaust gas may flow over the finned tubes, transferring a considerable portion of its heat to the feedwater flow, and thereby produce steam.

The flow of steam 24 from the heat recovery steam generator 12 then may be directed to the steam turbine 13. The steam turbine 13 may include a rotor 26 having a rotor bore 27 disposed axially therein. In normal operation the steam 24 may be introduced to the steam flow path 30 of the steam turbine 13 where it may be expanded, thereby generating rotary work. The rotor 26 of the steam turbine 13 may be coupled with a second generator 28 to generate electricity. In a particular embodiment, both the gas turbine and the steam turbine may be coupled to the same generator to generate electricity. After exiting the steam turbine 13, the steam may be dumped to a condenser 29.

During start-up, the gas turbine 11 may be brought to steady-state operation as quickly as possible. Exhaust 22 from the gas turbine 11 may be directed to the heat recovery steam generator 12 which yields a flow of steam 24. A period of time may elapse before the heat recovery steam generator 12 is capable of generating steam at sufficient temperature and pressure to be introduced to the steam turbine 13. Introducing low temperature, low pressure steam to the steam turbine 13 could result in undesirable condensation within the steam turbine flow path 30. Steam may be dumped to the condenser 29 via conduit 31 until it reaches a sufficient temperature and pressure for introduction into the steam turbine 13.

An outlet 32 may be provided for removing at least a portion of the compressed air 18 from the compressor 14 of the gas turbine 11. In another embodiment, a compressor separate from the compressor 14 of the gas turbine 11 may be provided to supply compressed air. The compressor separate from the compressor 14 of the gas turbine 11 may be powered by an electric motor, a piston engine, a gas turbine, a steam turbine, or another power source. During start-up the portion of compressed air 18 may be provided to the rotor bore 27 of the steam turbine 13 via a conduit 33. The conduit 33 may include any means by which the compressed air 18 may be transmitted from the compressor 14 to the rotor bore 27. A valve 34 may be provided for controlling flow through the conduit 33. During start-up the valve 34 may be opened to allow flow from the compressor 14 to the rotor bore 27, thereby heating the rotor 26 before steam is introduced to the steam flow path 30. Once start-up is complete, the valve 34 may be closed, thereby directing the compressed air through the turbine 16 to produce useful work.

The steam turbine 13 may include a system 35 for introducing the compressed air flow to the rotor bore 27 of the steam turbine 13. Once the compressed air flow passes through the rotor bore 27 of the steam turbine 13, a second system 36 may be provided for removing the compressed air from the rotor bore 27. Systems suitable for introducing a flow to the rotor bore of a turbine are known to those of skill in the art. For example, a suitable system for introducing a gas to the rotor bore of a steam turbine is described in U.S. Pat. No. 5,498,131 to Minto. Once it exits the rotor bore 27, the compressed air may be vented to the atmosphere.

Figure 2:
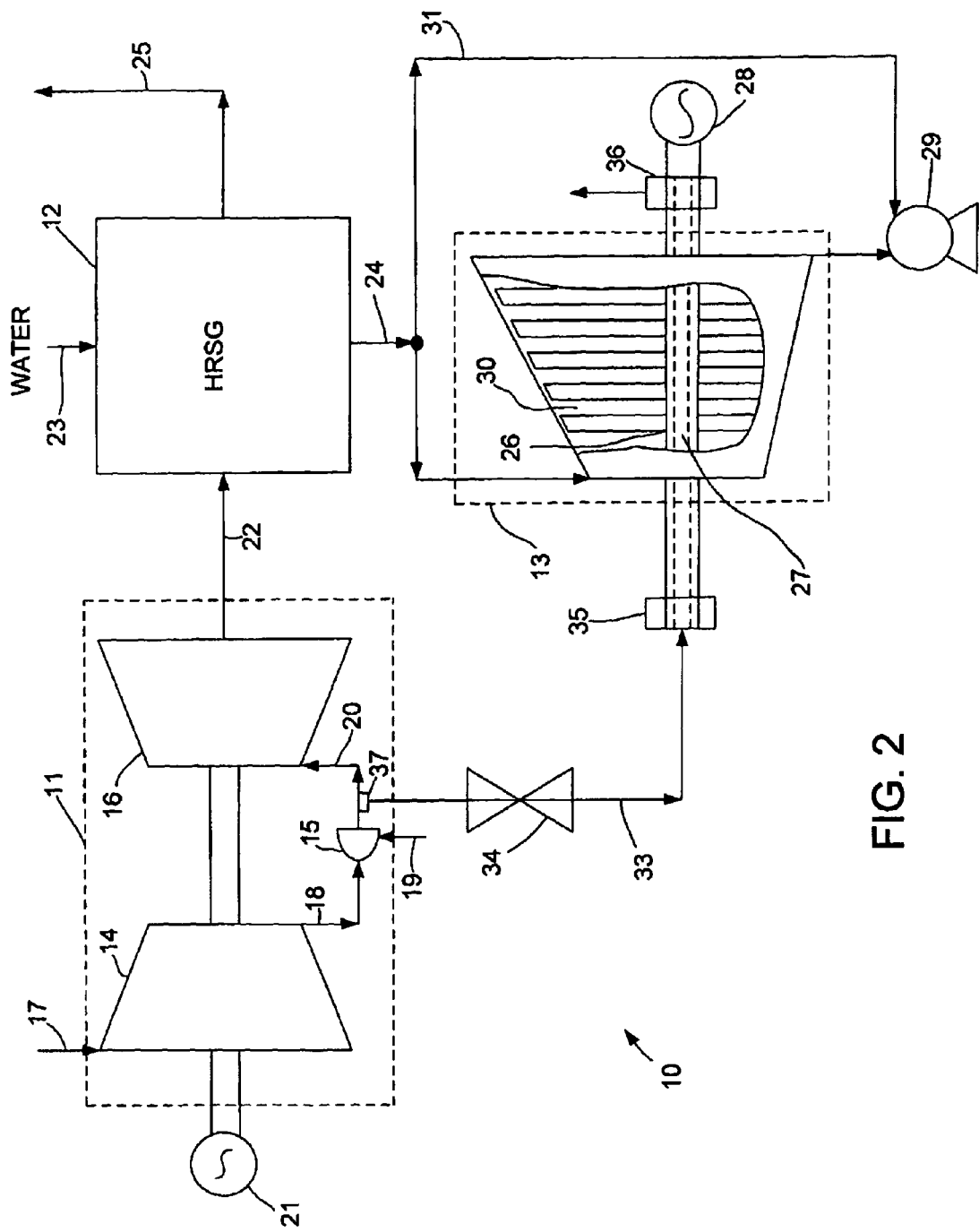
FIG. 2 is a schematic view of a power plant of an embodiment of the present application as described herein.

FIG. 2 shows a schematic view of a power plant in accordance with an embodiment of the present application. By contrast with FIG. 1, the power plant of FIG. 2 includes an outlet 37 for removing at least a portion of the heated combustion gas 20 from the combustor 15 of the gas turbine 11. During start-up the portion of heated combustion gas 20 may be provided to the rotor bore 27 of the steam turbine 13 via a conduit 33. A valve 34 may be provided for controlling flow through the conduit 33. In a particular embodiment, a cooling system may be provided for cooling the conduit. During start-up the valve 34 may be opened to allow flow from the combustor 15 to the rotor bore 27, thereby heating the rotor 26 before steam is introduced to the steam flow path 30. Once start-up is complete, the valve 34 may be closed, thereby directing the heated combustion gas 20 through the turbine 16 to produce useful work.

The steam turbine 13 may include a system 35 for introducing the heated combustion gas to the rotor bore 27 of the steam turbine 13. Once the heated combustion gas passes through the rotor bore 27 of the steam turbine 13, a second system 36 may be provided for removing the heated combustion gas from the rotor bore 27. Once it exits the rotor bore 27, the heated combustion gas may be vented to the atmosphere. In another embodiment, the heated combustion gas may be provided to the heat recovery steam generator 12 after passing through the rotor bore 27.

By heating the steam turbine during start-up, the apparatus and methods of the present application may reduce thermal stresses and may decrease overall start-up times of combined cycle power plants.

It should be understood that the foregoing relates only to the preferred embodiments of the present application and that numerous changes and modifications may be made herein without departing from the general spirit and scope of the invention as defined by the following claims and the equivalents thereof.

We claim:

1. A power plant, comprising:
   a gas turbine comprising a compressor for producing compressed air, a combustor for combusting the compressed air with a combustible fuel to produce a heated combustion gas, and a turbine for expanding the heated combustion gas;
   a heat recovery steam generator for generating a flow of steam from an exhaust of the gas turbine;
   a steam turbine for expanding the flow of steam from the heat recovery steam generator, the steam turbine comprising a rotor having a rotor bore disposed axially therein; and
   a conduit for directing at least a portion of the heated combustion gas prior to expansion in the turbine to the rotor bore of the steam turbine, wherein the at least a portion of the heated combustion gas warms the rotor bore of the steam turbine.

2. The power plant of claim 1, further comprising a valve for controlling flow through the conduit.

3. The power plant of claim 1, wherein the conduit directs heated combustion gas from the combustor of the gas turbine to the rotor bore of the steam turbine.

4. The power plant of claim 3, further comprising an outlet for removing the at least a portion of the heated combustion gas from the combustor of the gas turbine.

5. The power plant of claim 1, further comprising a system for introducing the at least a portion of the heated combustion gas to the rotor bore of the steam turbine.

6. The power plant of claim 1, further comprising a condenser for condensing steam from the exhaust of the steam turbine.

7. In a power plant having (i) a gas turbine comprising a compressor, a combustor, and a turbine for expanding a heated combustion gas, (ii) a heat recovery steam generator, and (iii) a steam turbine comprising a rotor having a rotor bore disposed axially therein, a method of heating the steam turbine during start-up, comprising:

compressing ambient air in the compressor to produce compressed air;

combusting the compressed air with a combustible fuel to produce a heated combustion gas;

removing at least a portion of the heated combustion gas from the combustor prior to expansion in the turbine; and providing the at least a portion of the heated combustion gas to the rotor bore of the steam turbine, wherein the at least a portion of the heated combustion gas heats the rotor.

8. The method of claim 7, further comprising providing an outlet for removing the at least a portion of the heated combustion gas from the combustor of the gas turbine.

9. The method of claim 7, wherein the step of providing the at least a portion of the heated combustion gas to the rotor bore of the steam turbine comprises selectively diverting the heated combustion gas from the combustor prior to expansion in the turbine through a conduit to the rotor bore of the steam turbine.

10. The method of claim 9, further comprising providing a valve for controlling flow through the conduit.

* * * * *